United States Patent [19]

Mizukami

[11] Patent Number: 5,243,514
[45] Date of Patent: Sep. 7, 1993

[54] SYSTEM FOR GENERATING NUMERICAL CONTROL INFORMATION

[75] Inventor: Yuto Mizukami, Niwa, Japan

[73] Assignee: Okuma Corporation, Aichi, Japan

[21] Appl. No.: 722,554

[22] Filed: Jun. 25, 1991

[30] Foreign Application Priority Data

Jun. 26, 1990 [JP] Japan .................................. 2-167354

[51] Int. Cl.$^5$ .................... G06F 15/46; G05B 19/403
[52] U.S. Cl. ................................ 364/191; 364/474.22
[58] Field of Search .................. 364/474.22, 474.24, 364/474.26, 191, 474.35

[56] References Cited

U.S. PATENT DOCUMENTS

| | | | |
|---|---|---|---|
| 4,661,912 | 4/1987 | Imanishi | 364/474.11 |
| 4,736,306 | 4/1988 | Christensen et al. | 364/191 |
| 4,750,105 | 6/1988 | Ohkawa et al. | 364/191 |
| 4,788,636 | 11/1988 | Shiratori et al. | 364/191 |
| 4,868,761 | 9/1989 | Hayashi | 364/474.24 |
| 4,928,221 | 5/1990 | Belkhiter | 364/191 |
| 5,115,400 | 5/1992 | Watanabe et al. | 364/474.24 |

Primary Examiner—Jerry Smith
Assistant Examiner—Paul Gordon
Attorney, Agent, or Firm—Wenderoth, Lind & Ponack

[57] ABSTRACT

A numerical control information generating system evaluates all the factors comprehensively in determination of a machining method simply by comparing a threshold with a sum of evaluation values of plural judgement factors. The evaluation values of the judgement factors may be obtained by an evaluation function assigned to each of the factors. If the evaluation values are defined to be varying continuously, they become close to dimensions which are approximate to each other. This may minimize the inconveniences heretofore caused in determination of a machining method such that an extremely small dimensional difference in a step distinguishes a face machining from a longitudinal machining. If the weight which is to be multiplied on each of the judgement factors is suitably varied, the factors may easily be selected or prioritized according to the intent of an operator. Moreover, the ratio of the face machining against the longitudinal machining may be adjusted by suitably setting a threshold.

5 Claims, 6 Drawing Sheets

SYSTEM FOR GENERATING NUMERICAL CONTROL INFORMATION

BACKGROUND OF THE INVENTION

The present invention relates to a system for generating a numerical control information which generates a numerical control information when blanks are machined by numerically controlled machines.

So-called numerical control systems which automatically control machines and tools with numerical control information comprising numerals and codes have been widely used and greatly contributed to the automation in processing, and reduction of the machining cost and time.

In such a numerical control system, it is necessary to input information for the numerical control prior to machining. In order to simplify the step, there has widely been used a numerical control information generating system which receives data in an interactive mode and generates a numerical control information. By using the numerical control information generating system of this type, such information for the numerical control may be generated for machining simply by inputting the material and shapes of blanks, and the machining methods (i.e. machining region, cutting directions, cutting tools, cutting conditions, machining order, etc). Recently there has been proposed a numerical control information generating system which can automatically determine a machining method and generate the numerical control information simply by inputting the blank shapes and the part shapes.

The present applicant has proposed a numerical control information generating system which can automatically determine the machining methods (see Japanese Laid-open Patent No. 65945/1990), an embodiment of which being shown by the block diagram of FIG. 1.

The numerical control information generating system comprises a processor (CPU) 1 which controls the whole system, a control memory 2 which stores programs for controlling the system, and a blank shape/part shape memory 3 which stores information on the blank shapes and the part shapes. The system also includes a machining step table registering memory 4 for registering a machining step table which stores the information on the machining steps, a display unit 5 which displays processing procedure information and the like, and an operation board 6 which receives as an input the blank shapes and the part shapes. It further comprises a temporary memory 7 which stores temporarily the information such as graphic element columns and the like, a numerical control information storing memory 8 for the numerical control information which stores information for the numerical control, and a parameter memory 9 which stores parameters for selecting a machining method. These above component parts may exchange information with each other through a bus line BL.

FIG. 5 shows an example of a blank shape and a part shape. The flowchart of FIG. 2 explains the process under which the above mentioned numerical control information generating system determines whether it should select a face machining or a longitudinal machining in order to obtain the process from a blank shape into a part shape.

A judgement is made as to whether or not an inclination A with respect to the X-axis of a graphic element $e_2$ which forms a part shape within the region R which is inputted by an operator as the region requiring machining is within a parameter $\theta_p$ (Step S101). If it is judged that the inclination A is not within the parameter $\theta_p$, the graphic element $e_2$ is determined to be the object of longitudinal machining (Step S105) and the whole process terminates and is thereby completed. If it is judged, on the other hand, that the inclination A is within the parameter $\theta_p$, a judgement is made as to whether or not the length L of the graphic element $e_2$ inputted by the operator in relation to the X-axis is longer than the parameter $L_p$ registered in the parameter memory 9 (Step S102). If it is judged that the length L is not longer than the parameter $L_p$, the graphic element $e_2$ is determined to be object of the longitudinal machining (Step S105) and the process is thereby completed.

On the other hand, if it is judged that the length L of the X-axis is longer than the parameter $L_p$, a rectangular region constituting of the graphic element $e_2$ and the blank shape is generated, and a judgement is made as to whether or not the cutting stock D in the direction of the Z-axis (longitudinal direction) inputted by the operator is smaller than the parameter $W_p$ registered in the parameter memory 9 (Step S103). If it is judged that the cutting stock D is not smaller than the parameter $W_p$, the graphic element $e_2$ is determined to be the object of the longitudinal machining (Step S105) and the whole process is thereby completed. If the cutting stock D is smaller than the parameter $W_p$, the graphic element $e_2$ is determined to be the object of face machining (Step S104) and the whole process is completed.

The above mentioned conventional numerical control information generating system determines a graphic element as the object of the face machining only when all the conditions in the Steps 101, 102 and 103 shown in FIG. 2 have been satisfied. A judgement as to whether or not each of those conditions is satisfied is made independently in each step based on the parameters inputted in advance. Therefore, if the inclination and the length of a graphic element satisfy the conditions of Steps S101 and S102, and if the parameter $W_p$ at the Step S103 is 20 [mm], and the cutting stock D of the rectangle formed with the graphic element and the blank shape is 20 [mm], the condition in the Step S103 is satisfied, too. Then the graphic element becomes the object of the face machining. However, if the cutting stock D is 20.001 [mm], it does not satisfy the condition of the Step S103, the graphic element becomes the object of the longitudinal machining.

In the conventional system a graphic element is compared with parameters separately in each step, and if there is one step which does not quite satisfy a condition, then the graphic element is judged as an object of a longitudinal machining instead of a face machining. However, when an operator judges with his/her discretion whether it should be the longitudinal machining or the face machining, he/she judges factors at each step not only separately but comprehensively, and even if one condition in a step is not quite satisfied by a small margin, he/she may judge the graphic element to be the object of the face machining. The judgement given automatically by the system therefore does not always agree with what would be made by operators.

SUMMARY OF THE INVENTION

The present invention was contrived in order to obviate the above problems encountered in the prior art and aims at providing a numerical control information generating system which can determine an optimal machining method.

According to one aspect of the present invention, for achieving the objects described above, there is provided a numerical control information generating system of the type for generating a numerical control information for machining steps of recognizing a machining region based on input blank shapes and part shapes, and machining the region, which is characterized in that there is further provided a memory for storing evaluation functions for plural judgement factors in order to determine a machining method based on said input blank shapes and part shapes so that the sum of evaluation values determined by said evaluation functions is compared with a pre-set threshold to thereby select a machining method.

The above object and other features of the present invention will be understood more clearly by reading the detailed description of preferred embodiments herein in conjunction with the attached drawings.

DETAILED DESCRIPTION OF PREFERRED EMBODIMENT

The present invention will now be described referring to an embodiment shown in drawings.

Figure 1:
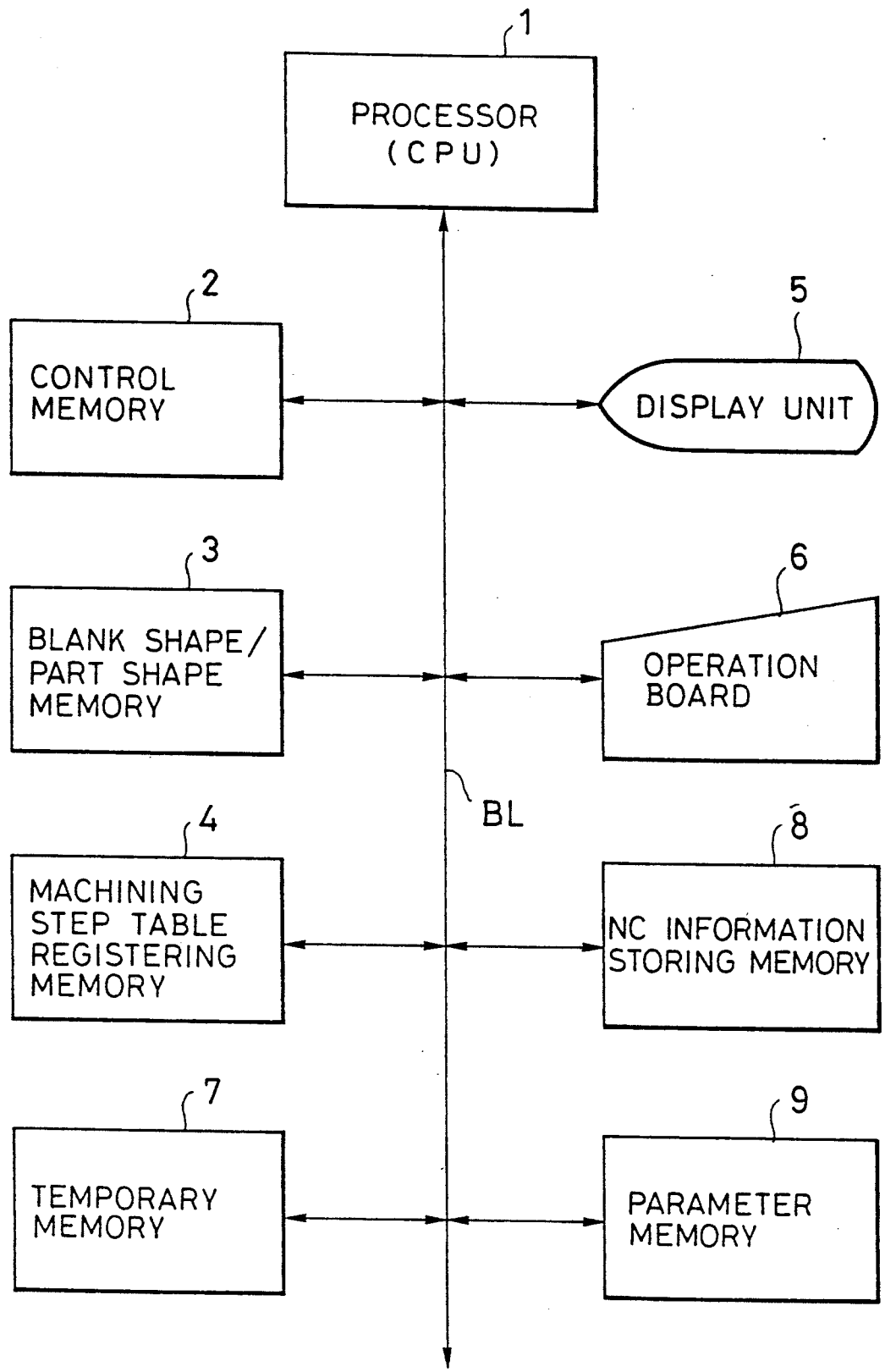
FIG. 1 is a block diagram to showing an embodiment of a prior art numerical control information generating system.
Figure 2:
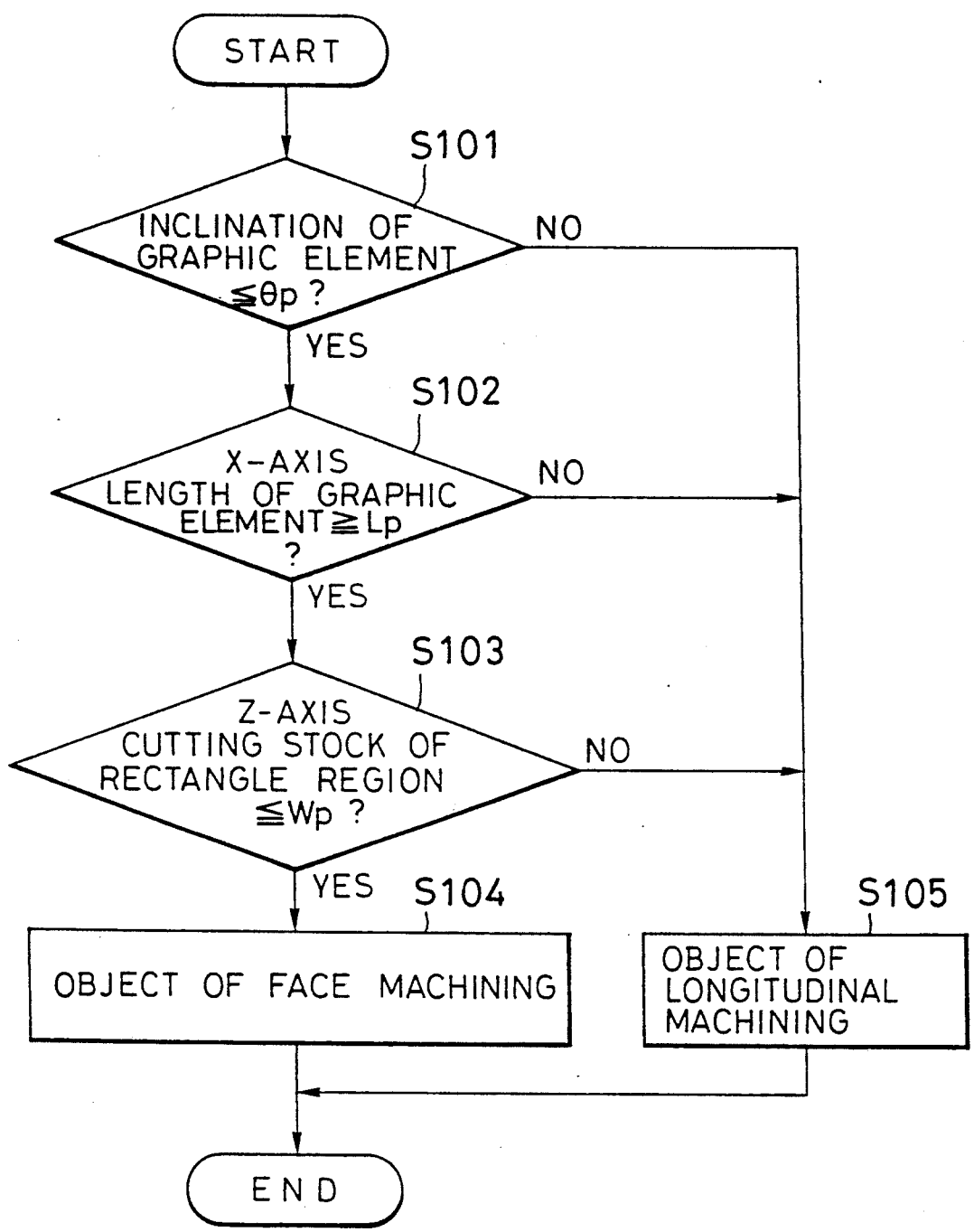
FIG. 2 is a flowchart showing an example of the operation of the system of FIG. 1.
Figure 3:
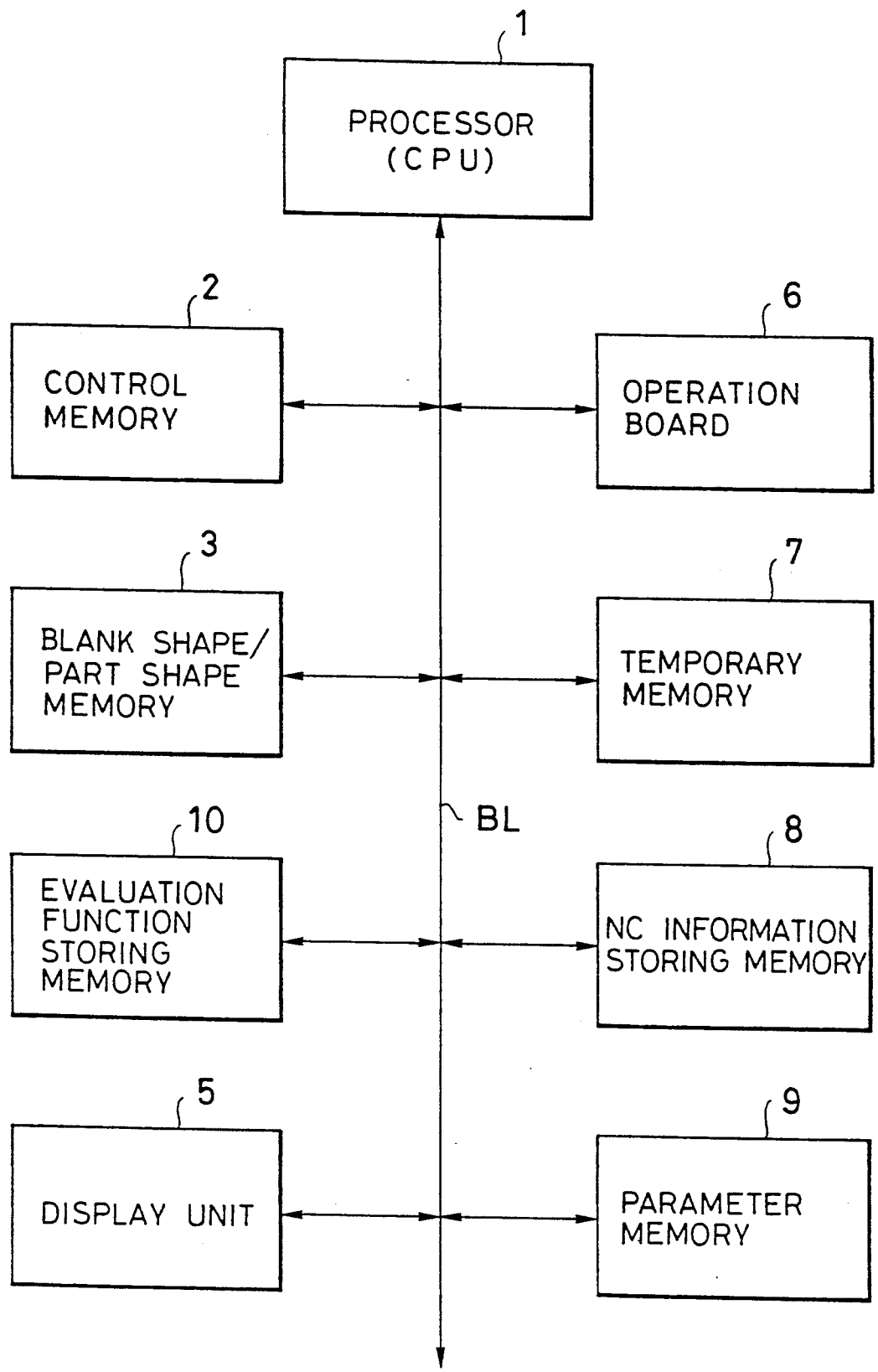
FIG. 3 is a block diagram showing an embodiment of the numerical control information generating system according to the present invention.

FIG. 3 is a block diagram showing the numerical control information generating system according to the present invention in correspondence with FIG. 1. The same component parts are denoted by the same reference numerals, and repeated descriptions thereof have been omitted. The numerical control information generating system is provided with an evaluating function storing memory 10 which stores evaluation functions for the judgement factors for determining a machining method.

Figure 4:
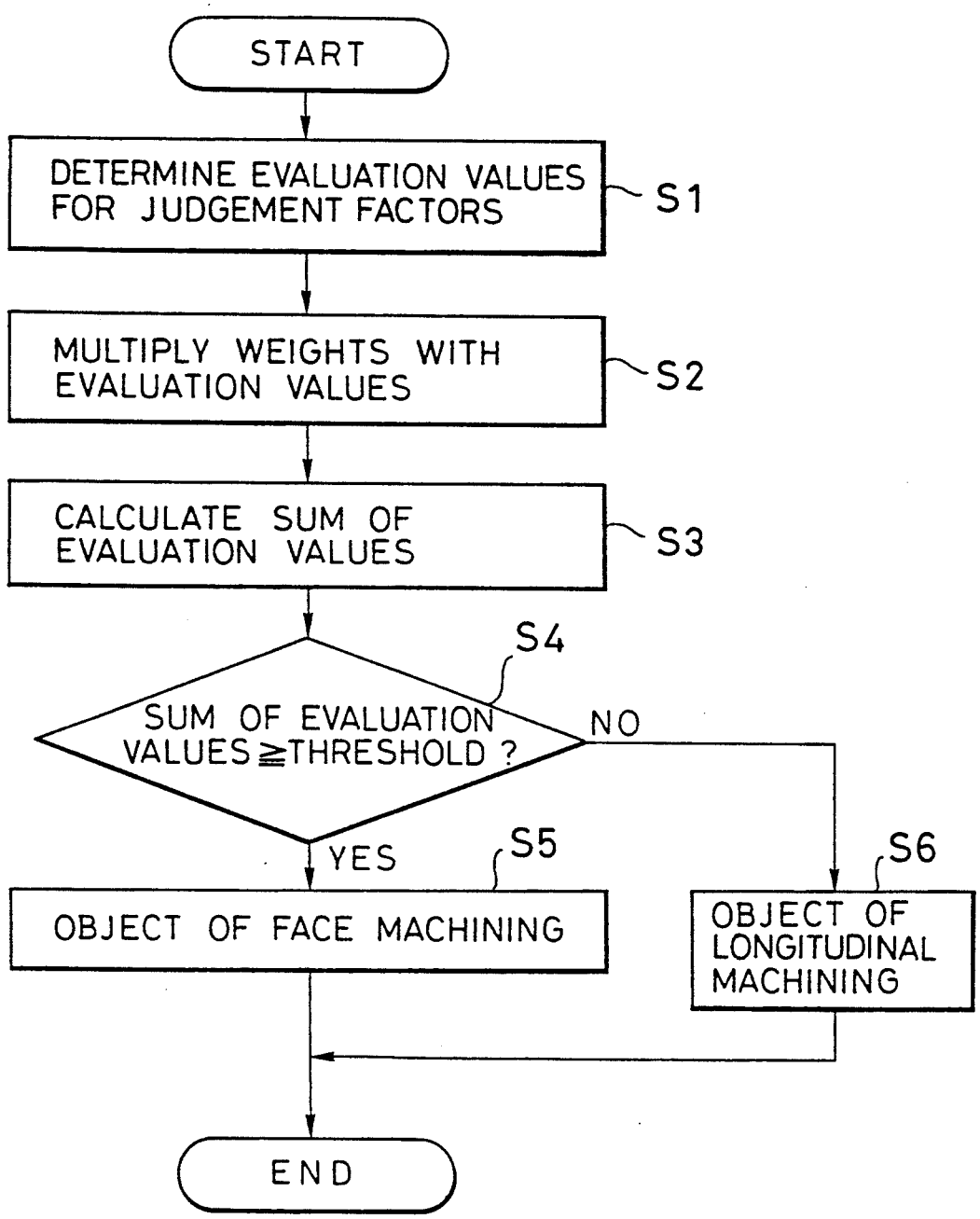
FIG. 4 is a flowchart showing an example of the operation of the system of FIG. 3.
Figure 5:
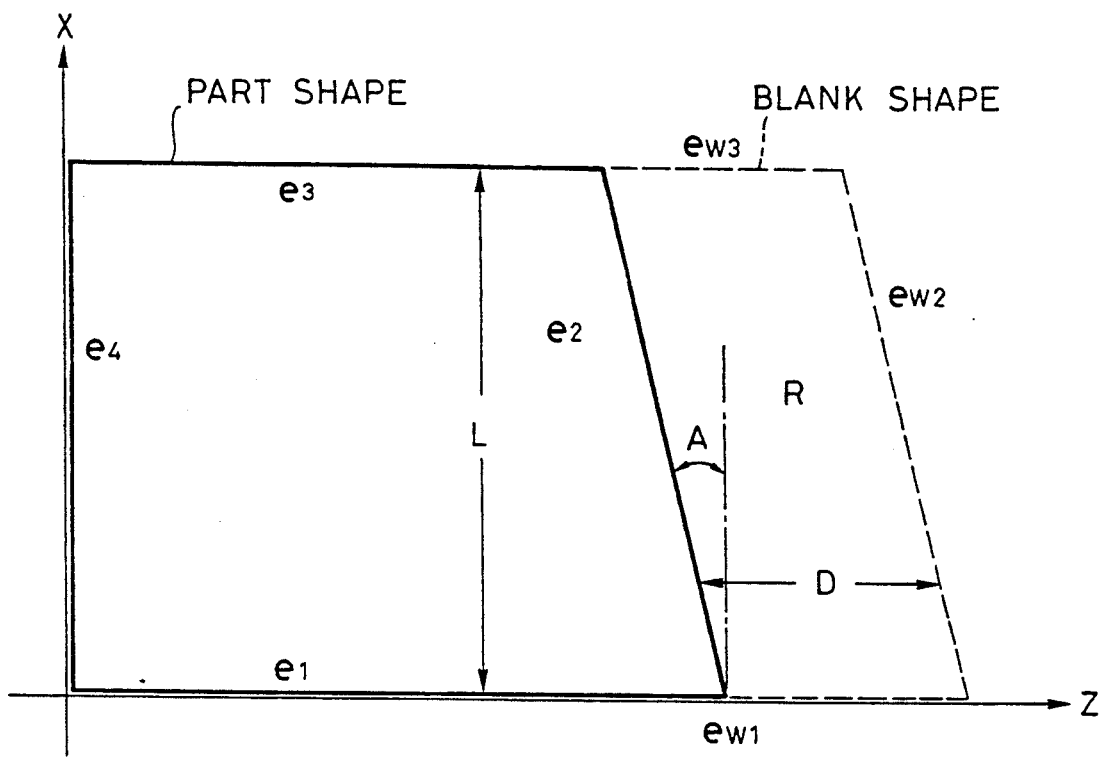
FIG. 5 is a view for explaining the state of machining.

The system operates as shown in the flowchart of FIG. 4. A blank shape and a part shape which have been inputted in advance via a display unit 5 and an operation board 6 are stored in the blank shape/part shape memory 3. It is assumed herein the blank shape/part shape memory 3 stores the blank and part shapes shown in FIG. 5.

In the first step, evaluation values for plural judgement factors are obtained to determine if a face machining or a longitudinal machining should be selected for a graphic element $e_2$ which forms a part shape within the region R which needs the machining (Step S1). It is assumed herein that the inclination of the graphic element, the length of the graphic element on the X-axis, and the cutting stock D on the Z-axis in the rectangular region formed by the graphic element and the blank shape, and the evaluating function storing memory 10 stores the evaluation functions for the judgement factors as shown in FIGS. 6A through 6C.

Figure 6A:
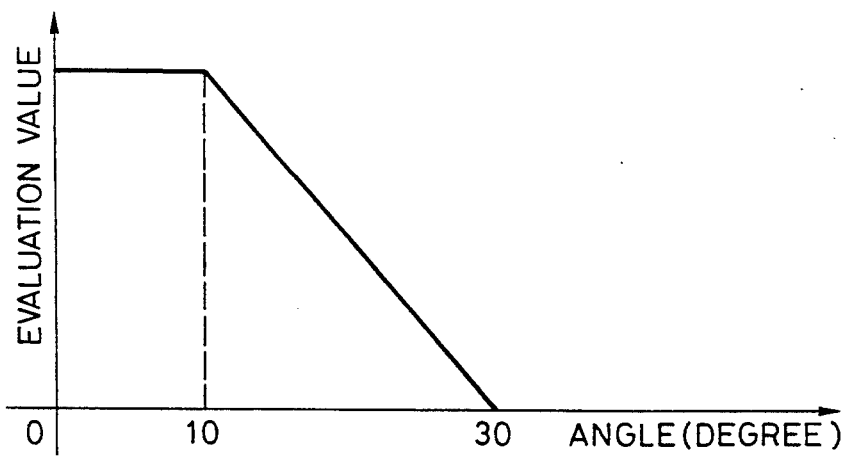
FIGS. 6A, 6B and 6C are graphs showing examples of evaluation functions for judgement criteria in determining the machining method.
Figure 6B:
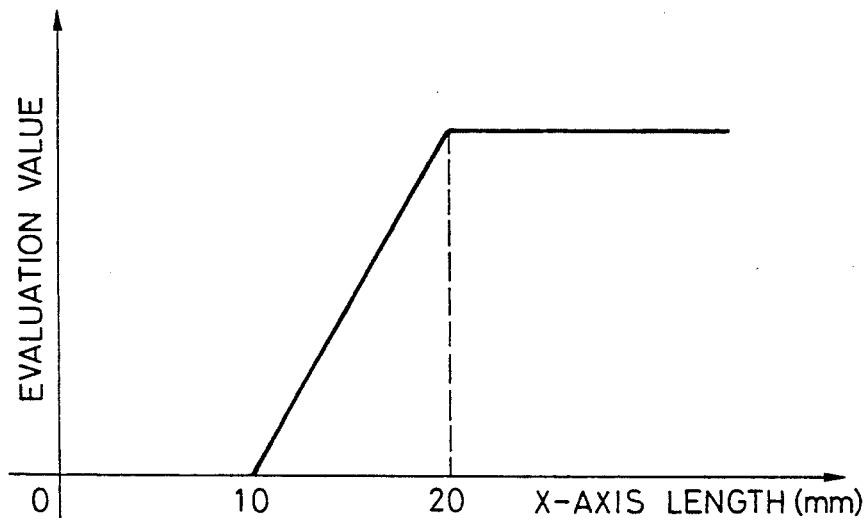
Figure 6C:
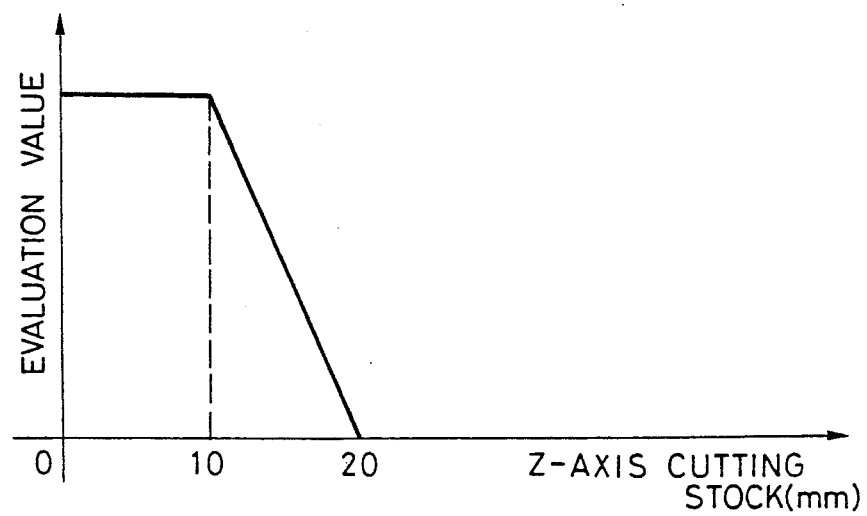

The processor 1 obtains an evaluation value $U_1$ for the inclination A of the graphic element $e_2$ based on the evaluation function of FIG. 6A, the evaluation value $U_2$ for the length L on the X-axis of the graphic element $e_2$ based on the evaluation function shown in FIG. 6B and the evaluation value $U_3$ for the cutting stock D on the Z-axis in the rectangular region based on the evaluation function shown in FIG. 6C. Then, weights $W_i$ ($i=1,2,3$) for the judgement factors are read out from the parameter memory 9, and the read-out weights are multiplied by respective evaluation values $U_1$, $U_2$ and $U_3$ (Step S2), and the sum of weighted evaluation values M is calculated according to the formula (1) below (Step S3). The weights $W_i$ represent the degree of importance of each factor. In other words, the more important a factor is regarded, the larger its weight becomes.

$$M = W_1 \cdot U_1 + W_2 \cdot U_2 + W_3 \cdot U_3 \qquad (1)$$

Then, the threshold T is read out from the parameter memory 9 and compared with the sum M of the evaluation values of the judgement factors (Step S4). If the sum M of the evaluation values is larger than the threshold T, the graphic element $e_2$ is determined to be the object of face machining (Step S5), and if the sum M is smaller than the threshold T, the graphic element $e_2$ is determined to be the object of longitudinal machining (Step S6). The whole process is then completed.

A description follows of the method of specifying the judgement factors for determining the above mentioned machining method, the method to inputting the weight on the evaluation value on each judgement factor, and the method of inputting the threshold in order to compare the value with the sum of the evaluation values.

Figure 7:
FIG. 7 shows examples of display of the judgement factors for determining the machining method, weights to be multiplied on evaluated values of each judgement factor and threshold values to be compared with the sum of evaluated values.

The processor 1 displays on the display unit 5 the images shown in FIG. 7. Then, the operator moves a cursor downward by pressing a cursor key to reach either the data column of the weight W or of the threshold T, and inputs the desired numerals. When the desired numerals have been inputted by the operator, the processor 1 stores the input numerals in the parameter memory 9. The processor 1 specifies the factors in which the weight has been inputted as the selected judgement factor for determining a machining method.

As described in detail in the foregoing, the numerical control information generating system according to the present invention allows an operator to obtain an optimal machining method simply by inputting a blank shape and a part shape. The present invention system therefore can save the time and labor which are otherwise needed for correcting data as well as enable operators who are unskilled or inexperienced in machining methods to easily generate the optimal numerical control information.

It should be understood that many modifications and adaptations of the invention will become apparent to those skilled in the art and it is intended that such obvious modifications and changes are encompassed by the scope of the claims appended hereto.

What is claimed is:

1. A numerical control information generating system for generating numerical control information for machining steps of recognizing a machining region based on input blank shapes and part shapes, and for machining the region, including a memory for storing evaluation functions for plural judgement factors in order to determine a machining method based on said input blank shapes and part shapes, means for summing evaluation values determined by said evaluation functions and comparing the sum with a pre-set threshold to thereby select a machining method.

2. A numerical control information generating system as claimed in claim 1, wherein each of the evaluation values for the plural judgement factors for determining said machining method is multiplied by a weight.

3. A numerical control information generating system as claimed in claim 2, wherein said weight is corresponding to said judgement factors.

4. A numerical control information generating system as claimed in claim 2, wherein said evaluation functions are functions for angle, X-axis length and Z-axis cutting stock.

5. A numerical control information generating system as claimed in claim 1, wherein said evaluation functions are functions for angle, X-axis length and Z-axis cutting stock.

* * * * *